United States Patent [19]
Nakamura et al.

[11] Patent Number: 5,534,939
[45] Date of Patent: Jul. 9, 1996

[54] DIGITAL VIDEO CLOCK GENERATION SYSTEM

[75] Inventors: Michael D. Nakamura, Portland; Howard A. Landsman, Beaverton, both of Oreg.

[73] Assignee: Tektronix, Inc., Wilsonville, Oreg.

[21] Appl. No.: 352,641

[22] Filed: Dec. 9, 1994

[51] Int. Cl.$^6$ .................................................. H04N 5/04
[52] U.S. Cl. ........................................ 348/505; 348/500
[58] Field of Search .................................. 348/500, 501, 348/505, 506, 508, 513, 514, 441, 454, 489; H04N 5/04, 9/44, 9/45

[56] References Cited

U.S. PATENT DOCUMENTS

| | | | |
|---|---|---|---|
| 4,463,371 | 7/1984 | Lewis, Jr. ........................... | 348/505 |
| 4,516,150 | 5/1985 | Gurley ............................... | 348/489 |
| 4,612,568 | 9/1986 | den Hollander et al. .......... | 348/505 |
| 5,008,749 | 4/1991 | Ruckert .............................. | 348/495 |
| 5,008,751 | 4/1991 | Wischermann .................... | 348/495 |
| 5,068,717 | 11/1991 | Jenison ............................... | 348/506 |
| 5,132,784 | 7/1992 | Hague et al. ...................... | 348/505 |
| 5,335,194 | 8/1994 | Clayton et al. ................... | 364/724.1 |

OTHER PUBLICATIONS

"Draft IEC 1709: Helical–Scan Digital Composite Video Cassette Recording System Using 19 mm Magnetic Tape, Format D–2 (NTSC, PAL, PAL–M)" International Electrotechnical Commission, Mar. 27, 1992.

"Interfaces for Digital Component Video Signals in 525–Line and 625 Line Television Systems"Rep. 962–1, Rec. 656, The CCIR (1986).

"Proposed SMPTE Standard for Television—System M/NTSC Composite Video Signals—Bit–Parallel Digital Interface" SMPTE 244M, Aug. 25, 1992.

*Primary Examiner*—Safet Metjahic
*Assistant Examiner*—Chris Grant
*Attorney, Agent, or Firm*—Francis I. Gray

[57] ABSTRACT

A digital clock generation system provides both a digital composite clock and a digital component clock synchronized with an input synchronization video signal. The digital composite clock is generated from the burst portion of the input synchronization video signal, and the digital component clock is synthesized from the digital composite clock. A frame timing pulse is generated at regular intervals from the composite sync of the input video signal for resetting the digital component clock to establish a defined phase relationship between the digital composite and component clocks according to an offset constant.

4 Claims, 1 Drawing Sheet

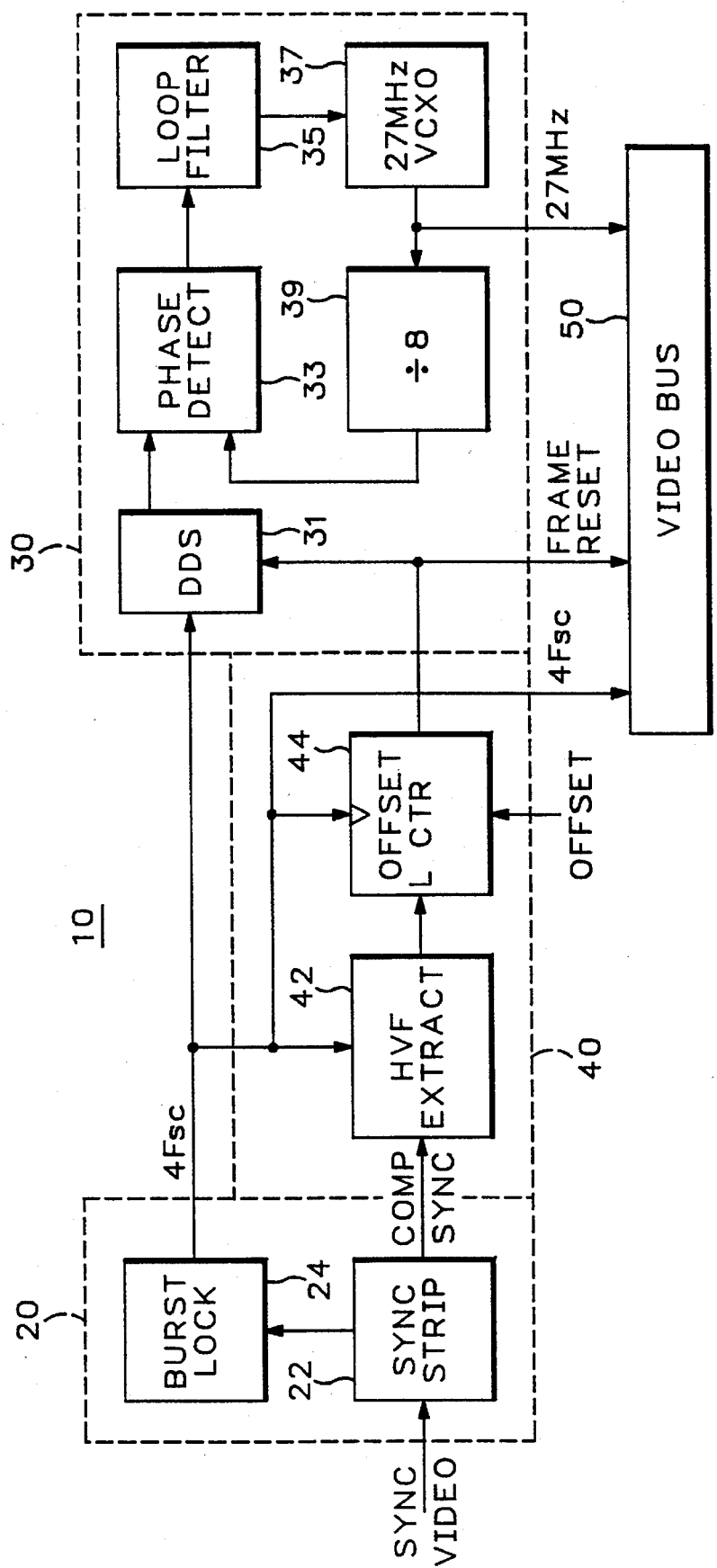

DIGITAL VIDEO CLOCK GENERATION SYSTEM

BACKGROUND OF THE INVENTION

The present invention relates to clock generation systems, and more particularly to a digital video clock generation system for digital video systems that deal with both component and composite digital video standards.

Component video standards, such as those defined in Recommendation ITU-R BT.656 "Interfaces for Digital Component Video Signals in 525-line and 625-line Television Systems Operating at the 4:2:2 level of Recommendation 601", incorporated herein by reference, normally specify a data rate of 27 MHZ, while composite digital standards, such as SMPTE 244M and IEC 1709 Section 5, incorporated herein by reference, specify a data rate related to the systems color subcarrier frequency, i.e., four times the subcarrier frequency (4 fsc). For a system that deals with both data rates, such as digital composite to digital component transcoders, a 27 MHz and 4 fsc clock needs to be generated. The 4 fsc clock needs to be locked to the color burst of the video signal being used as a synchronization source, while the 27 MHz clock simultaneously needs to be locked to the horizontal line rate of the same video signal. In order to facilitate signal processing, i.e., sample rate conversion, the relationship between the 27 MHz clock, the 4 fsc clock and the video signal needs to be precisely known, i.e., the frequencies need to be precisely related. It also means that the phase relationship, as defined at a specific point on the synchronization source video signal, needs to be precisely known.

What is desired is a digital video clock generation system that achieves precise relationship between the 27 MHz clock, the 4 fsc clock and the synchronization source video signal in a reliable manner for both PAL and NTSC video systems with only minor changes in system overall operation.

SUMMARY OF THE INVENTION

Accordingly the present invention provides a digital clock generation system for achieving precise relationship between a digital component clock signal, a digital composite clock signal and a synchronization source video signal. The digital composite clock signal is derived from a burst portion of the synchronization source video signal, while the digital component clock signal is derived from the digital composite clock signal. In this manner both digital clock signals are synchronized with the synchronization source video signal. A frame timing pulse is derived from a composite sync signal recovered from the synchronization source video signal. The frame timing pulse also is used with the digital composite clock signal to generate the digital component clock signal so that there is a known phase relationship between the digital composite and component clock signals.

The objects, advantages and novel features of the present invention are apparent from the following detailed description when read in conjunction with the appended claims and attached drawing.

BRIEF DESCRIPTION OF THE DRAWING

The FIGURE is a block diagram view of a digital clock generation system according to the present invention.

DESCRIPTION OF THE PREFERRED EMBODIMENT

Referring now to the FIGURE a digital clock generation system 10 is shown having three primary subsystems: burst lock 20, phase lock loop (PLL) 30, and horizontal/vertical/field (HVF) extraction 40. A synchronization video signal is input to a sync stripper circuit 22, the outputs from which are a burst signal and a composite sync signal. The burst signal is input to a burst lock oscillator 24 which produces an output having a frequency equal to four times the subcarrier frequency of the burst signal, i.e., the 4 fsc clock. The 4 fsc clock is thus locked to the synchronization video signal independent of the other subsystems of the digital clock generation system 10. The 4 fsc clock is input to the PLL 30 to generate a digital component clock signal (27 Mhz for this example).

The 4 fsc clock is input to a direct digital synthesizer (DDS) circuit 31 which is setup to synthesize a frequency equal to an integer fraction, such as one/eighth, of the digital component clock frequency. The fractional digital component clock from the DDS 31 is input to a phase detector 33, the output of which is input to a loop filter circuit 35. The output from the loop filter circuit 35 is a voltage control signal for a very stable voltage controlled oscillator 37, such as a voltage controlled crystal oscillator (VCXO). The frequency of the output from the VCXO 37 is the digital component clock. The digital component clock is input to a divider circuit 39 to generate another fractional digital component clock for input to the phase detector circuit 33. In this manner the digital component clock is synchronized to the 4 fsc clock which in turn is synchronized to the synchronization video signal.

The HVF extractor 40 provides a reference point relative to the synchronization video signal as phase offset is defined by resetting a phase accumulator within the DDS 31. In NTSC, for example, there are an integer number of 4 fsc and 27 MHZ clock cycles in a video line. Because of this the phase relationship of the digital component clock edges and the 4 fsc clock edges are the same on each line, but the exact relationship is unknown. In PAL there are an integer number of 27 MHZ clock cycles per video line, but there are not an integer number of 4 fsc clock cycles per video line. Because of this the phase relationship between the component clock edges and the 4 fsc clock edges is not the same on each line of video, and in fact is constantly changing. This changing relationship takes a full frame of video to repeat itself, i.e., 625 video lines. Again without additional circuitry the exact nature of this phase relationship is unknown.

The composite sync signal from the sync stripper 22 is input to an HVF extractor circuit 42 together with the 4 fsc clock. The output from the HVF extractor circuit 42 is input to an offset counter 44. The offset counter 44 is loaded to a particular offset by the output from the HVF extractor circuit 42, which is essentially a frame reset pulse. The output from the offset counter 44 is a FRAME RESET pulse. By changing the offset loaded into the offset counter 44 the FRAME RESET pulse may be moved relative to the synchronization video signal. For PAL the counter 44 produces the FRAME RESET pulse every 8 fields on a precisely known line and field with a precise relationship to the horizontal sync of the composite sync signal determined by the offset. For NTSC the counter 44 produces the FRAME RESET pulse every 4 fields, again on a precisely known line and field with a precise relationship to the horizontal sync of the composite sync signal, again determined by the offset. The FRAME RESET pulse is input to the DDS 31 to reset the phase accumulator of the DDS and thus allow a known relationship between the 4 fsc signal and the digital component clock at the output of the DDS, i.e., the phase relationship is established by the FRAME RESET pulse.

The frequency multiplication factor to get the component clock signal and the time between FRAME RESET pulses may be varied as long as certain criteria are met. Specifically for NTSC the number of 4 fsc clock cycles between FRAME RESET pulses must be an integer multiple of 910, the number of 4 fsc clock cycles per video line. For PAL the number of 4 fsc click cycles between FRAME RESET pulses must be an integer multiple of 709,379, the number of 4 fsc clocks in a frame. In addition the number of component clock cycles between FRAME RESET pulses must be exactly divisible by the frequency multiplication factor.

Additionally it is desirable if the FRAME RESET pulse may be used to pass color framing information on to other circuitry. A convenient way of doing this is to make the FRAME RESET pulse occur once every 4 fields in NTSC since NTSC has a 4 field color sequence, and once every 8 fields in PAL since PAL has an 8 field color sequence. The FRAME RESET pulse, the 4 fsc clock and the digital component clock are output to a video bus 50 to provide appropriate timing for video circuits that are coupled to the video bus.

Thus the present invention provides a digital clock generation circuit that provides a composite clock signal and a component clock signal that are synchronized to a video signal and which have a known phase relationship to each other, the composite clock signal being derived from the video signal, the component clock signal being derived from the composite clock signal, and the phase relationship between the two being established by a timing signal derived from the composite sync signal from the video signal, the SCH phase of the synchronization video signal as represented by the composite clock signal, and an offset constant.

What is claimed is:

1. A digital clock generation system comprising:
    means for generating from a composite synchronization video signal a digital composite clock signal and a composite sync signal;
    means for generating from the digital composite clock signal a digital component clock signal; and
    means for generating from the composite sync signal, the digital composite clock signal and an offset constant, a timing pulse for input to the digital component clock generating means to establish a known phase relationship between the digital composite and component clock signals.

2. The digital clock generation system as recited in claim 1 wherein the digital composite clock signal generating means comprises:
    means for stripping from the composite synchronization video signal the composite sync signal and a burst signal; and
    means for generating from the burst signal the digital composite clock signal.

3. The digital clock generation system as recited in claim 1 wherein the digital component clock signal generating means comprises:
    means for synthesizing from the digital composite clock signal and the timing pulse, a synthesized clock signal that has a frequency that is a predetermined integer fraction of the frequency of the digital component clock signal;
    means for generating from the synthesized clock signal and a frequency divided digital component clock signal, a control signal, the frequency of the frequency divided digital component clock signal being the predetermined integer fraction of the digital component clock signal frequency; and
    means for generating in response to the control signal the digital component clock signal.

4. The digital clock generation system as recited in claim 1 wherein the timing pulse generating means comprises:
    means for extracting an internal frame reset pulse from the composite sync signal; and
    means for counting the pulses of the digital composite clock signal to produce the timing pulse every predetermined number of counts offset by the offset constant to produce the known phase relationship, the offset constant being loaded into the counting means by the internal frame reset pulse.

* * * * *